(12) United States Patent
Takeda et al.

(10) Patent No.: US 6,321,147 B1
(45) Date of Patent: Nov. 20, 2001

(54) UNMANNED VEHICLE RUNNING SYSTEM

(75) Inventors: Shu Takeda; Masanori Tojima; Koji Takeda, all of Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/574,005

(22) Filed: May 19, 2000

(30) Foreign Application Priority Data

May 21, 1999 (JP) .................................................. 11-141528

(51) Int. Cl.$^7$ ....................................................... G05D 1/00
(52) U.S. Cl. ................................. 701/23; 701/24; 701/28; 701/211; 348/113; 348/119; 340/435; 340/436; 180/167; 180/168
(58) Field of Search .................................. 701/23, 24, 25, 701/26, 28, 210, 211; 348/118, 119, 113, 116; 340/435, 436, 425.5; 180/167, 168, 169

(56) References Cited

U.S. PATENT DOCUMENTS 5,155,683 * 10/1992 Rahim .............................. 364/424.02

FOREIGN PATENT DOCUMENTS 8-75848 3/1996 (JP).

\* cited by examiner

*Primary Examiner*—Yonel Beaulieu
(74) *Attorney, Agent, or Firm*—Arstrong, Westerman, Hattori, McLeland & Naughton, LLP.

(57) ABSTRACT

An unmanned vehicle running system, capable of reducing a stop time of a vehicle by immediately judging whether or not an obstacle blocks the passage when detecting the obstacle. For this purpose, the unmanned vehicle running system has a plurality of vehicles (1) running without a driver in a predetermined course (3) while detecting the current position and a central monitor station (2) for monitoring operations of the plurality of vehicles, wherein each of said vehicles is provided with a phototaking device (24) for taking a photo of the course, with a vehicle communication unit (23) for transmitting the taken image to the central monitor station, and with an obstacle detecting unit (5) for detecting an obstacle (4) which blocks the passage, wherein the central monitor station is provided with a central communication unit (8) for receiving the image and with a monitor (9) for displaying the image, and wherein the phototaking device takes a photo when the obstacle detecting unit detects an obstacle.

4 Claims, 7 Drawing Sheets

UNMANNED VEHICLE RUNNING SYSTEM

FIELD OF THE INVENTION

The present invention relates to an unmanned running system for running a vehicle such as a dump truck without a driver.

BACKGROUND OF THE INVENTION

Conventionally, there is known an unmanned running system for running a vehicle such as a dump truck without a driver in a working site such as a mine.

Figure 9:
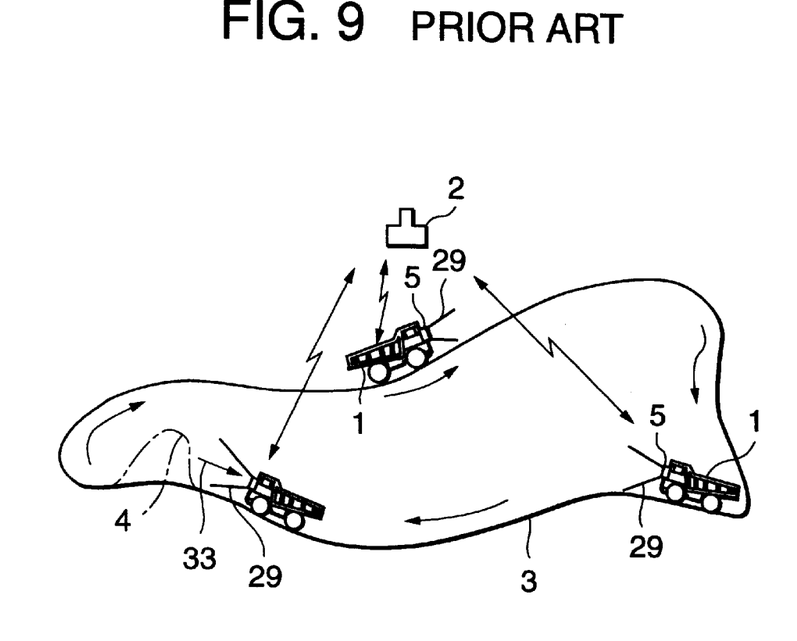
FIG. 9 is an explanatory diagram of an unmanned running system according to a prior art.

Referring to FIG. 9, there is shown an explanatory diagram of an unmanned running system according to a prior art. In this diagram, the unmanned running system has a plurality of vehicles 1 and a central monitor station 2 for monitoring operations of the plurality of vehicles 1.

The central monitor station 2 is arranged in a predetermined position in a working site and an observer is resident in the inside the central monitor station. The vehicle 1 has a position detecting unit (not shown) for detecting the current position to run without a driver in a predetermined course 3 under a supervision of the central monitor station 2 while communicating therewith wirelessly.

The vehicles 1 has an obstacle detecting unit 5 for detecting an obstacle 4 in the course 3.

The obstacle detecting unit 5 comprises a transmitter for emitting transmitted waves 29 such as electric waves or laser beams in a running direction and a receiver for receiving reflected waves 33, that is, the transmitted waves 29 which have returned to the vehicle after being reflected on the obstacle 4. By comparing the transmitted waves 29 with the reflected waves 33, it is detected whether or not there is any obstacle 4 in the course 3 in which the vehicle 1 is running in addition to a detection of a distance from the vehicle 1 to the obstacle 4.

The obstacle detecting unit 5 stops the vehicle 1 to prevent the vehicle 1 from colliding with the obstacle 4 if it recognizes the obstacle as one blocking the advance of the vehicle 1 such as a man, another vehicle 1, or a load which has dropped out of another vehicle 1. Then, a worker goes to the stopped place and removes the obstacle 4 before starting the vehicle 1.

The prior art, however, has problems below.

In other words, the obstacle detecting unit 5 sometimes stops the vehicle 1 recognizing a recess or projecting portion or an upward slope as the obstacle 4 by mistake in the course 3 in which the vehicle 1 is running.

Figure 10:
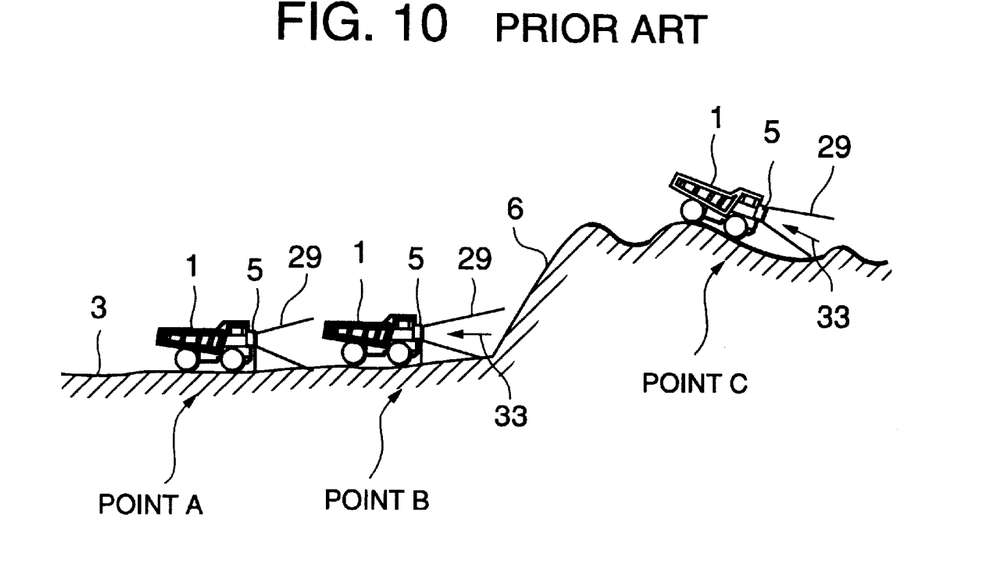
FIG. 10 is an explanatory diagram of a vehicle running in a course by using the unmanned running system according to the prior art.

Referring to FIG. 10, there is shown an explanatory diagram viewed from a lateral angle of the vehicle 1 running without a driver in the course 3. In this diagram, if the vehicle 1 is running in the even plane course 3 like a point A, it is possible to sense precisely whether or not there is an obstacle 4. If this vehicle 1 has approached an upward slope 6 like a point B, transmitted waves 29 are reflected on the upward slope 6 ahead of the vehicle 1 and the obstacle detecting unit 5 may recognize this upward slope 6 as an obstacle 4 by mistake.

In addition, the vehicle 1 causes pitching when running in the course 3 having recess or projecting portions like a point C, by which transmitted waves 29 are emitted downward and reflected on the ground, and it may recognize the ground as an obstacle 4 by mistake. The vehicle 1 is frequently stopped by this error recognition, and therefore there is a problem that a working efficiency of the unmanned running system is lowered.

Furthermore, it is hard for the obstacle detecting unit 5 to judge a size, materials and the like of the obstacle 4 (hereinafter, referred to as "true characters of the obstacle 4"). Therefore when the obstacle detecting unit 5 detects an obstacle 4, a worker always needs to go to a position of the stopped vehicle 1, independently of whether or not the obstacle is correctly recognized. Then, the worker determines whether or not the detected obstacle 4 blocks the advance of the vehicle 1 or whether or not the vehicle can run directly. If the vehicle 1 can run directly, it is restarted. In this manner, a lot of time is required to restart the vehicle 1, and therefore there is a problem that a working efficiency of the unmanned running system is lowered.

SUMMARY OF THE INVENTION

In view of these problems, the present invention has been provided. It is a first object of the present invention to provide an unmanned vehicle running system having an obstacle detecting unit, capable of recognizing obstacles almost correctly. It is a second object of the present invention to provide an unmanned vehicle running system having an obstacle detecting unit capable of reducing a stop time of the vehicle by immediately judging whether or not an obstacle blocks the passage at detecting the obstacle.

In order to achieve the above object, according to a first aspect of the invention there is provided an unmanned vehicle running system comprising a plurality of vehicles running without a driver in a predetermined course while detecting the current position and a central monitor station for monitoring operations of the plurality of vehicles, wherein each of the vehicles is provided with a phototaking device for taking a photo of a course and with a vehicle communication unit for transmitting the taken image to the central monitor station and wherein the central monitor station is provided with a central communication unit for receiving the image and with a monitor for displaying the image.

According to the first aspect of the invention, the vehicle is provided with the phototaking device for taking a photo of the course and the taken an image is transmitted to the central monitor station and displayed on the monitor.

Therefore, for example, in case of such an event inhibiting the vehicle to continue to run without a driver that the vehicle gets out of the course because of detecting the current position incorrectly or that the vehicle collides with an obstacle, an observer resident in the central monitor station, observing this image, can immediately understand what has occurred. Accordingly if it is necessary to go to the place of the vehicle to remove an obstacle in the course or to repair the vehicle, a car for removal or repair components can be prepared quickly.

Therefore, the vehicle can restart the operation quickly by reducing the stop time for the vehicle, by which a working efficiency of the unmanned running system is improved.

According to a second aspect of the invention, there is provided an unmanned vehicle running system according to the first aspect, wherein the vehicle is provided with an obstacle detecting unit for detecting an obstacle which blocks the passage and wherein the phototaking device takes a photo when the obstacle detecting unit detects an obstacle.

According to the second aspect of the invention, the vehicle control unit stops the vehicle or reduces its speed when the obstacle Is detected and the phototaking device takes a photo of the course and transmits it to the central monitor station.

Accordingly, the central monitor station only needs to observe the monitor just when an obstacle is detected and to be informed of whether or not there is an obstacle or of its material and size without a need for observing the monitor at all times, by which the observer is less burdened in observing the operations. If the obstacle detecting unit recognizes a non-obstacle as an obstacle by mistake, it can be checked on the monitor and the vehicle can be restarted without a need for the observer to go to the place of the vehicle and therefore the stop time for the vehicle is reduced, by which a working efficiency of the unmanned running system is improved.

According to a third aspect of the invention, there is provided an unmanned vehicle running system according to the first or second aspect, wherein the central monitor station is provided with a manual phototaking switch for inputting a phototaking instruction and with a central communication unit for transmitting this phototaking instruction to respective vehicles, wherein each of the vehicles is provided with a vehicle communication unit for receiving the phototaking instruction, and wherein the phototaking device takes a photo when the phototaking instruction is inputted.

According to the third aspect of the invention, phototaking can be instructed manually. Therefore, it is possible to take a photo of a course at a timing desired by the observer, by which the image can be checked again even if the first transmitted image is hard to see, so that a more detailed observation is enabled. Accordingly, true characters of the obstacle can be obtained reliably, by which it becomes possible to reduce such cases that the vehicle is restarted though an obstacle exists in the course and collides with the obstacle or conversely a worker goes to a stop place of the vehicle though there is no obstacle and he wastes a time.

Furthermore, by using the manual phototaking switch, a scope ahead of the vehicle can be checked immediately before restarting the vehicle. Accordingly in case of an obstacle entering the course from the moment of taking the first image to the restart of the vehicle, the obstacle can be checked, thereby reducing the possibility that the vehicle collides with the obstacle.

Therefore, the unmanned running system can be operated without a delay, by which the working efficiency is improved.

According to a fourth aspect of the invention, there is provided an unmanned vehicle running system, comprising a position detecting unit for detecting the current position and an obstacle detecting unit for detecting an obstacle which blocks the passage in the vehicle side and a vehicle control unit for running the vehicle without a driver in a predetermined course on the basis of detection signals from the position detecting unit and from the obstacle detecting unit, wherein the vehicle control unit registers a position of the vehicle and the detection signals from the obstacle detecting unit when the obstacle detecting unit recognizes a non-obstacle as an obstacle by mistake, and judges whether or not the vehicle has approached the registered position during running so as to prevent the non-obstacle from being recognized as an obstacle by mistake on the basis of the registered detection signals in the vicinity of the registered position.

According to the fourth aspect of the invention, the obstacle detecting unit stores the error recognition position where a non-obstacle such as an upward slope or unevenness of the course is recognized as an obstacle incorrectly. If the vehicle approaches this error recognition position again, the obstacle detecting unit does not recognize the non-obstacle as an obstacle by mistake on the basis of the detection signals at the previous error recognition.

In other words, the error recognition is easily caused by ups and downs or recess or projecting portions of the course, and therefore the same error recognition is likely to occur and the vehicle stops repeatedly. Accordingly by previously registering these positions where error recognition may easily occur so as to prevent the positions from being incorrectly recognized, the error recognition are reduced. Therefore, the number of stops of the vehicle is lowered, by which the working efficiency of the unmanned running system is improved.

According to a fifth aspect of the invention, there is provided an unmanned vehicle running system according to the fourth aspect, comprising a central monitor station for observing operations of a plurality of vehicles, wherein each vehicle is provided with a vehicle communication unit and the central monitor station is provided with a central communication unit so that they can have radio communications with each other and wherein the central monitor station is provided with a central control unit for registering an error recognition position for each vehicle on the basis of a position of the vehicle received from the vehicle when the obstacle detecting unit recognizes a non-obstacle as an obstacle by mistake and wherein each vehicle is provided with a vehicle control unit for registering an error recognition position for the vehicle received from the central monitor station.

According to the fifth aspect of the invention, the error recognition position of each vehicle is transmitted to the central monitor station and the central control unit collectively manages the error recognition positions of respective vehicles to inform other vehicles of the positions.

In other words, error recognition is easily caused by ups and downs or recess or projecting portions of the course, and therefore other vehicles are likely to cause error recognition in positions where another vehicle has caused error recognition. Therefore, by previously registering the positions where a certain vehicle has caused error recognition to prevent other vehicles from causing the same error recognition in these positions, the unmanned running system less frequently causes error recognition. Therefore, the number of times the vehicle stops is reduced, by which the working efficiency of the unmanned running system is improved.

DETAILED DESCRIPTION OF THE PREFERRED EMBODIMENTS

An embodiment of an unmanned vehicle running system according to the present invention will be described below with reference to FIGS. 1 to 8. The same reference characters designate identical elements to those in FIGS. 8 and 9 used for the description of the prior art and their detailed description is omitted here.

Figure 1:
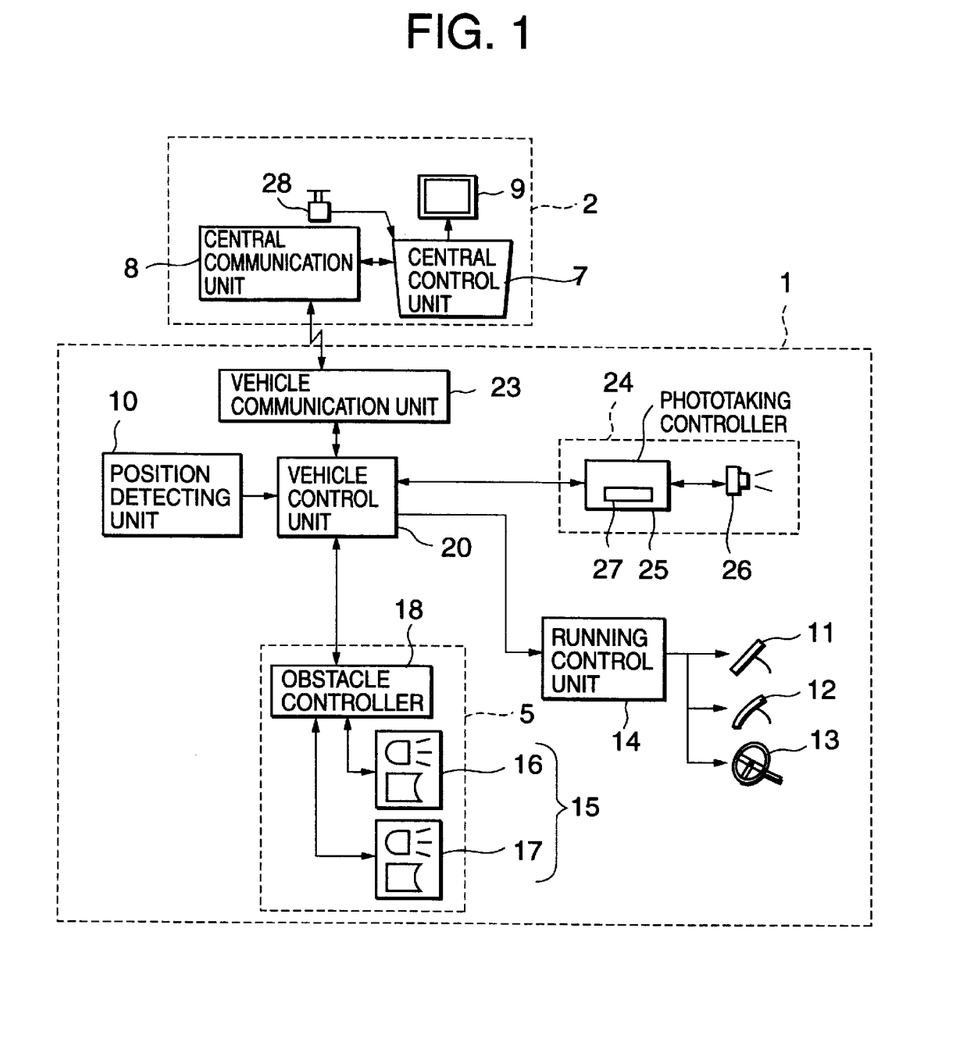
FIG. 1 is a configuration diagram showing an embodiment of an unmanned vehicle running system according to the present invention.

In FIG. 1, this unmanned running system comprises vehicles 1 such as a plurality of dump trucks and a central monitor station 2 for observing operations of the plurality of vehicles 1.

The central monitor station 2 is installed in a predetermined position in a working site such as, for example, a mine and inside the central monitor station an observer is resident. The central monitor station 2 has a central control unit 7 for monitoring the operation status of the plurality of vehicles 1 according to working conditions in order to determine how each vehicle 1 should be run in a course 3. This central control unit 7 is preferably a computer, having calculator means, memory means, and input means such as, for example, a keyboard.

In addition the central monitor station 2 has a central communication unit 8, which is capable of having radio communications with the plurality of vehicles 1 to instruct the vehicles 1 on running conditions. If the working site is a mine covering a wide area, UHF or VHF waves are used as radio carrier waves. In addition the central monitor station 2 has a monitor 9 connected to the central control unit 7.

A vehicle communication unit 23 is mounted on each vehicle 1, so that it can communicate with the central control unit 7. This vehicle communication unit 23 is connected to a vehicle control unit 20 for controlling operations of the vehicle 1. The vehicle control unit 20 has calculator means and memory means.

The vehicle control unit 20 is connected to a position detecting unit 10 for detecting the current position of the vehicle 1. The position detecting unit comprises an absolute position detector for detecting an absolute position of the vehicle 1 by using a GPS, for example, and a relative position detector for detecting a relative position of the vehicle 1 by using a vehicle speed sensor for measuring the number of rotations of a tire and a gyro for detecting a running direction.

The vehicle control unit 20 detects the current position of the vehicle 1 on the basis of outputs of the position detecting unit 10 and the current position is transmitted to the central control unit 7 via a radio communication. Accordingly, the central control unit 7 grasps the current position of each vehicle 1, outputs an instruction to the vehicle control unit 20 via a radio communication so that loading or other works can be conducted smoothly.

The vehicle control unit 20 is connected to a running control unit 14 for controlling running of the vehicle 1 by operating an accelerator 11, a brake 12, and a steering gear 13 of the vehicle 1. The vehicle control unit 20 outputs an instruction to this running control unit 14 on the basis of the instruction from the central control unit 7 to run the vehicle 1 without a driver in the predetermined course 3.

Furthermore, the vehicle control unit 20 is connected to an obstacle detecting unit 5 for detecting an obstacle 4 such as a man, another vehicle 1, or a load which has dropped out of another vehicle 1 existing in the course 3.

The obstacle detecting unit 5 has a radar unit 15. This radar unit 15 comprises a millimeter wave radar 16 and a laser radar 17 for transmitting millimeter waves and laser beams (hereinafter, generally referred to as "transmitted waves 29") and for receiving the millimeter waves and laser beams (hereinafter, generally referred to as "reflected waves 33") reflected on an object in the running direction and returning to the radar, respectively.

The obstacle detecting unit 5 has an obstacle controller 18 connected to the radar unit 15. This obstacle controller 18 is capable of comparing the transmitted waves 29 with the reflected waves 33 before calculation so as to detect whether or not there is an obstacle ahead of the vehicle 1 and a distance D up to the obstacle if so.

The obstacle controller 18 recognizes that there is an obstacle 4 ahead of the vehicle 1 if it judges that the obstacle detected ahead has a size equal to or greater than a predetermined value and exists within a predetermined distance (hereinafter, referred to as "effective detecting distance") or shorter of the vehicle 1 (hereinafter, referred to as "an effective detecting area 19"). This recognition is conducted when the above conditions are satisfied on the basis of a detection signal from at least one of the millimeter wave radar 16 and the laser radar 17. In general these millimeter wave radar 16 and the laser radar 17 are arranged in the vicinity of the horizontal both ends of the front of the vehicle 1 each.

On a predetermined position of the vehicle 1 there is mounted a phototaking device 24 capable of taking a photo of the course 3 in the running direction of the vehicle 1, being connected to the vehicle control unit 20.

This phototaking device 24 comprises a phototaking controller 25 for controlling phototaking and a charge coupled device camera (hereinafter, referred to as "CCD camera") 26, which is mounted on the front of the vehicle 1, for taking a photo of the course 3 on the basis of an instruction from the phototaking controller 25. This phototaking controller 25 has an image memory 27 for taking in an image of the CCD camera 26. When receiving an phototaking instruction, the phototaking controller 25 takes an image in front of the vehicle 1 by using the CCD camera 26 and stores the images into the image memory 27.

Otherwise, it is also possible for the CCD camera 26 to take images of the course 3 at all times. When a phototaking instruction is inputted from the vehicle control unit 20 to the phototaking controller 25, the phototaking controller 25 stores the images taken by the CCD camera 26 into the image memory 27 and transmits them to the vehicle control unit 20. The vehicle control unit 20 transmits these images to the central control unit 7 via a radio communication.

Otherwise, it is also possible for the image memory 27 to store and update images taken by the CCD camera 26 at predetermined time intervals at all times and to transmit the stored images to the central control unit 7 on the basis of a phototaking instruction.

The central control unit 7 is provided with a manual phototaking switch 28. With a depression of this manual phototaking switch 28, a phototaking instruction is transmitted to the phototaking controller 25 via a radio communication. Accordingly, the phototaking device 24 can take photos of the course 3 and can display the images on the monitor 9.

The CCD camera 26 may be installed at both of the front and the rear of the vehicle 1 in some cases. If it is so, it is possible to take photos in the running direction also when the vehicle 1 runs backward. In this condition, the phototaking controller 25 stores and transmits images of the CCD camera 26 mounted on one side of the running direction of the vehicle.

Figure 2:
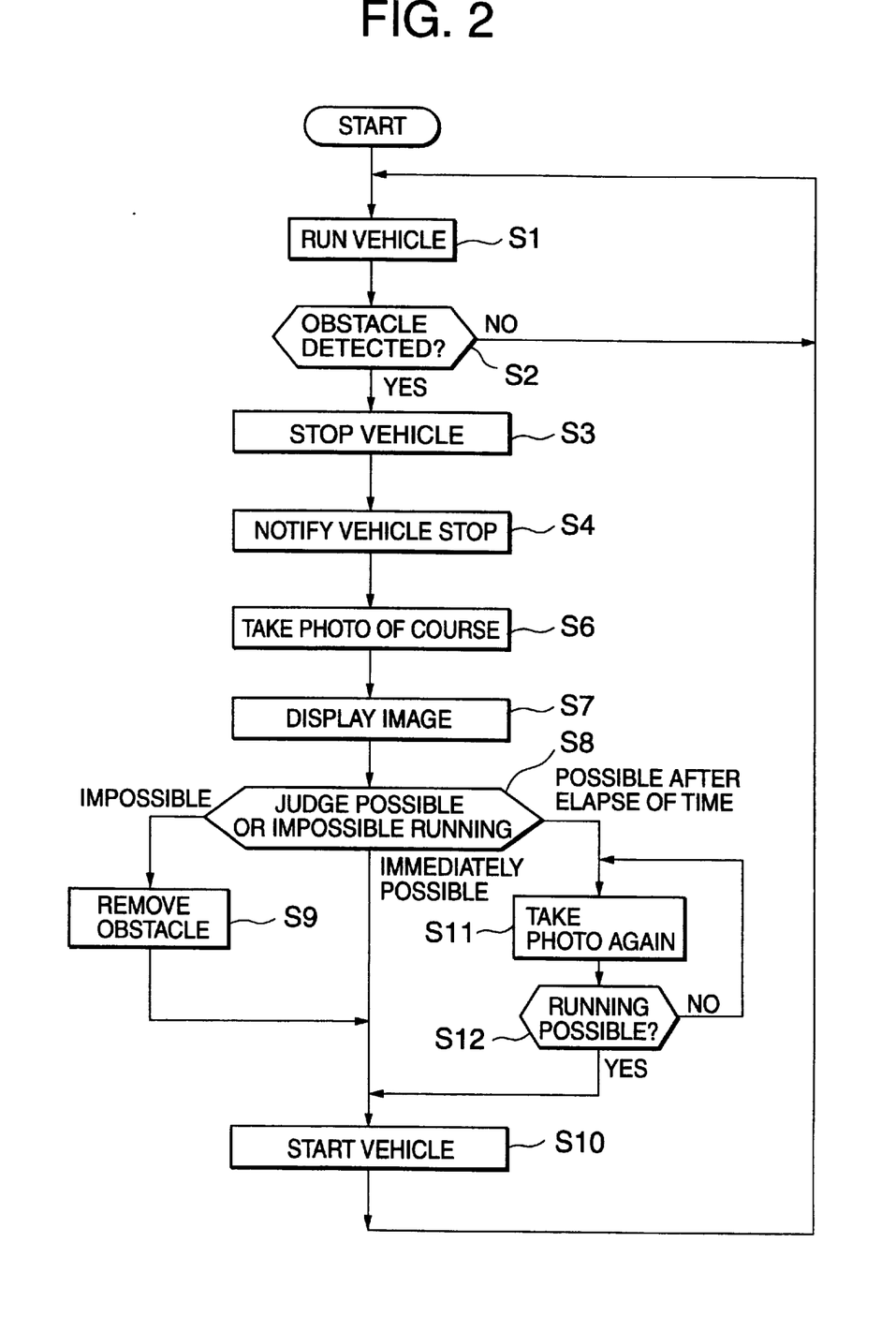
FIG. 2 is a flowchart of a procedure for checking an obstacle by means of the unmanned running system according to the present invention.

Next, a description will be made for a technique of reducing a stop time of the vehicle 1 by checking true characters of an obstacle 4 if it is detected by the obstacle detecting unit 5. Referring to FIG. 2, there is shown a flowchart of a procedure (hereinafter, designated by a reference character S) for checking the true characters of the obstacle 4.

The vehicle control unit 20 outputs an instruction to the running control unit 14 on the basis of an instruction from the central control unit 7 to run the vehicle 1 in the predetermined course 3 (S1). During this traveling, the obstacle detecting unit 5 judges whether or not there is an obstacle 4 in the course 3 (S2) and continues the running unless any obstacle 4 is sensed. If the obstacle detecting unit 5 senses any obstacle 4, the obstacle detecting unit 5 outputs a signal to the vehicle control unit 20 to notify it of a detection of the obstacle 4 and the vehicle control unit 20 outputs an instruction to the running control unit 14 to stop the vehicle 1 (S3). Then, the vehicle control unit 20 notifies the central control unit 7 of the stop of the vehicle 1 via a radio communication after the vehicle 1 stops (S4).

The vehicle control unit 20 outputs a phototaking instruction to the phototaking controller 25 to take a photo in the running direction of the vehicle 1 by using the CCD camera 26 (S6). The taken image is transmitted from the vehicle control unit 20 to the central control unit 7 via a radio communication and the central control unit 7 displays the received image on the monitor 9 (S7). An observer resident in the central monitor station 2 observes this image on the monitor 9 and judges true characters of the obstacle 4 to determine whether or not the vehicle 1 can continue to run (S8).

In this condition, the detected obstacle 4 is small-sized or outside the course 3 so as not to block the passage of the vehicle 1 or an upward slope 6 is recognized incorrectly as described in the prior art, the observer determines that "it is possible for the vehicle to run immediately."0 Subsequently the observer inputs a start instruction into the central control unit 7 and the central control unit 7 transmits an instruction to the vehicle control unit 20 to start the vehicle 1 (S10).

In addition if the obstacle 4 is a rock or the like in the course 3 in S8 of the procedure, the observer determines that "it is impossible for the vehicle 1 to run."0 Then, a worker goes to a place where the vehicle 1 stops to remove the obstacle 4 (S9) and to start the vehicle 1 in S10. Subsequently the process is returned to S1 of the procedure to run the vehicle 1.

If the obstacle 4 is one which will get out of the course 3 like a man or another vehicle I by itself, the observer determined that "it is possible for the vehicle to run after an elapse of a certain time." Subsequently he takes a photo of the course 3 by depressing the manual phototaking switch 28 after an elapse of a predetermined time (S11). Then, the observer judges whether or not the vehicle can continue to run on the basis of the image (S12). If there is not the obstacle, he determines that it is possible for the vehicle to run and progresses to S10 to start the vehicle 1.

It is possible for the observer to judge an effect of an obstacle 4 on the run more accurately by using the manual phototaking switch 28. In other words, an image transmitted from the vehicle 1 is too unclear to judge whether or not the obstacle 4 blocks the passage by means of an observation of the image, the observer depresses the manual phototaking switch 28 to take a photo again so as to check the true characters of the obstacle 4 more accurately.

If it is hard to judge what is the obstacle 4 due to a long distance D between the vehicle 1 and the obstacle 4 at taking a photo, the observer inputs a slowdown instruction to the central control unit 7 in a predetermined procedure to slow the vehicle 1 down so that it approaches the obstacle 4 proximately. Then, he can check the true characters of the obstacle 4 more accurately by depressing the manual phototaking switch 28 to take a photo.

Furthermore, immediately before a start of the vehicle 1 in S10 in the procedure, the observer can check an image of a scope ahead of the vehicle 1 by depressing the manual phototaking switch 28. This makes it possible to confirm whether or not there exists an obstacle 4 ahead of the vehicle 1 before a start thereof so as to prevent a collision.

In FIG. 2, the vehicle control unit 20 notifies the central control unit 7 of a stop of the vehicle 1 in S4 of the procedure and then outputs a phototaking instruction in S6 of the procedure, while the steps are not limited to them. In other words, immediately after receiving a signal that there exists an obstacle 4 in S2 of the procedure, it can outputs the phototaking instruction. Otherwise, the phototaking instruction can be output after S2 of the procedure and further the phototaking instruction can be output after S4 of the procedure.

As set forth hereinabove, the vehicle 1 is supplied with a phototaking device 24 for taking an image of the course 3 and an image used when the obstacle detecting unit 5 has detected an obstacle 4 is transmitted to the central monitor station 2, which is observed by the observer. The observer watches this image to judge immediately an effect on a travel given by the obstacle 4. In other words, if the obstacle detecting unit 5 recognizes the obstacle incorrectly or the obstacle 4 is so small or gets out of the course 3 by moving by itself, a worker need not go to the vehicle 1 before restarting the vehicle 1. It reduces a period of time during which the vehicle 1 is stopped, thereby improving a working efficiency.

In addition, the observer need not observe the monitor at all times. In other words, he need observe an image in detail only when the obstacle detecting unit 5 detects an obstacle 4, thereby reducing the burden on the observer for observation. Since the vehicle 1 transmits an image to the central monitor station 2 less frequently, thereby reducing a burden required for radio communications, by which an image can be transmitted without interrupting instructions transmitted from the central monitor station 2 to the vehicle.

Furthermore, the observer can transmit an image manually, and therefore when the first transmitted image is hard to see, he can check the image again at a desired timing for more detailed observation. Accordingly, he can be informed of the true characters of the obstacle 4 reliably, and therefore it is possible to prevent the vehicle 1 from being restarted though there is an obstacle 4 in the course 3 to collide with the obstacle 4 or to prevent a worker from going to a place where the vehicle 1 stops though there is no obstacle 4 to waste his time.

Additionally, a traveling direction of the vehicle 1 can be checked immediately before it is started by using the manual phototaking switch 28. Therefore, even if the obstacle 4 enters the course 3 during a period of time between the stop of the vehicle and the restart thereof, the obstacle 4 can be checked, so that the vehicle 1 does not collide with the obstacle 4.

Next, a description will be made for a technology for reducing error recognition caused by the obstacle detecting unit 5.

Previous to unmanned running, a driver first drives a vehicle 1 along a predetermined course 3 as manned running and performs teaching running during which the course 3 is stored in the vehicle control unit 20 and the central control unit 7. Subsequently the vehicle control unit 20 automatically runs the vehicle 1 with a driver on the basis of the information of the course 3 stored in the teaching running. It is referred to as a trial run.

Figure 3:
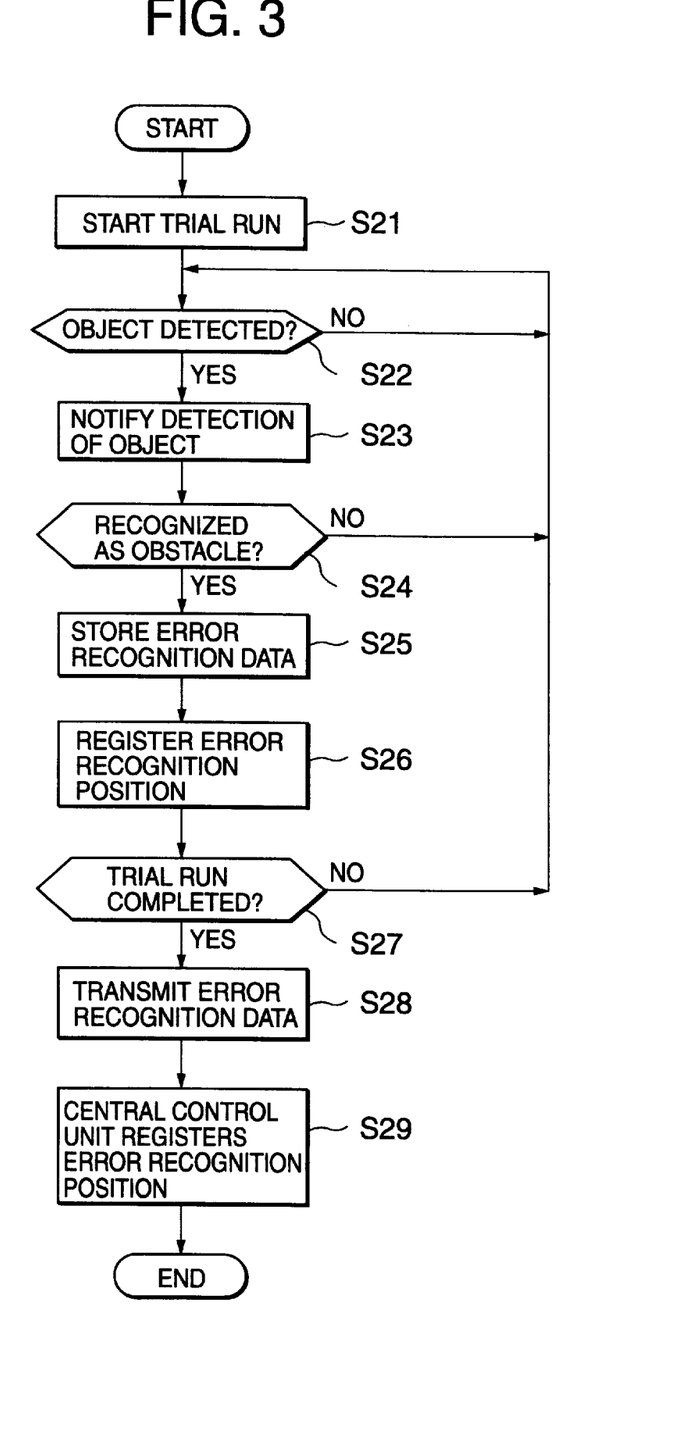
FIG. 3 is a flowchart of a procedure for a trial run of a vehicle using the unmanned running system according to the present invention.

FIG. 3 shows a flowchart of a procedure S for the trial run. Previous to the trial run, obstacles 4 are removed from the course 3 as completely as possible and any other vehicles 1 do not run in the trial run. In addition, even if the obstacle detecting unit 5 detects an object in the course 3 during the trial run, the vehicle control unit 20 is adapted not to transmit any instruction to the running control unit 14.

In this diagram, the vehicle control unit 20 starts the trial run of the vehicle 1 on the basis of the predetermined course 3 (S21). During this trial run, the driver visually observes the course 3 and stops the vehicle 1 by braking if the vehicle 1 begins to get off the course 3 or if the obstacle 4 exists in the course 3. The trial run is interrupted then. Subsequently the obstacle is removed or the vehicle 1 is returned to the course 3, and then the trial run is restarted at the place. Otherwise, it is also possible to return to the start point of the trial run at this time to restart the trial run.

If the obstacle detecting unit 4 detects an object in the course 3 during the trial run (S22), the obstacle controller 18 notifies the vehicle control unit 20 of the detection of the object (S23). The vehicle control unit 20 judges whether or not this object should be recognized as an object 4 on the basis of an output signal of the radar unit 15 (S24). Unless it is recognized as an object 4, the trial run of the vehicle 1 is continued.

In S24 of the procedure if the obstacle 4 is recognized in the course 3, the vehicle control unit 20 stores a recognized position, a distance D from the vehicle to the obstacle 4, and which of the millimeter wave radar 16 and the laser radar 17 detecting the obstacle 4 (S25). The above data is referred to as error recognition data.

Subsequently the vehicle control unit 20 registers this position as a position where the obstacle detecting unit 5 easily causes error recognition (it is referred to as error recognition position)(S26). In other words, an obstacle 4 is not observed in the course 3 by the observation of the driver, and therefore if the obstacle detecting unit 4 recognizes an obstacle 4 in the course 3, it can be judged as error recognition.

After the trial run is completed (S27), the vehicle control unit 20 transmits the error recognition data to the central control unit 7 via a radio communication (S28). Together with this error recognition data, the central control unit 7 registers the error recognition position and the error recognition data (S29). This registration can be performed automatically or be manually performed by an observer on the basis of the error recognition data. Otherwise, it is also possible for the observer to modify an automatically-performed registration manually.

Input means such as a mouse can be used for these registration or modification, for example, with displaying a map of the course 3 on the monitor 9 of the central control unit 7. In addition the error recognition position can be registered not only as a position where an error recognition occurs, but also as an area around the position.

As set forth hereinabove, the vehicle control unit 20 is informed of an error recognition of the obstacle 4 caused by the obstacle detecting unit 5 during the trial run, by which error recognition positions where the obstacle detecting unit 5 easily causes an error recognition are registered in the vehicle control unit 20.

On the basis of the registrations, the obstacle detecting unit 5 is adapted not to recognize an upward slope 6 or recess or projecting portions of the course 3 in the error recognition positions during unmanned running, by which error recognition is prevented.

In addition, this error recognition position is reported to the central control unit 7 via a radio communication, by which the central control unit registers the error recognition position for other vehicles 1. In other words, information on the error recognition position registered by using a single vehicle is shared with other vehicles 1, thereby omitting time and labor taken by registrations for respective vehicles.

Furthermore, the vehicle 1 is capable of performing unmanned running with error recognition positions being previously registered by referring to the error recognition positions of other vehicles 1 from the first unmanned running, and therefore the vehicle 1 less frequently is stopped by an error recognition during the first running, by which the unmanned running system improves in efficiency.

Figure 4:
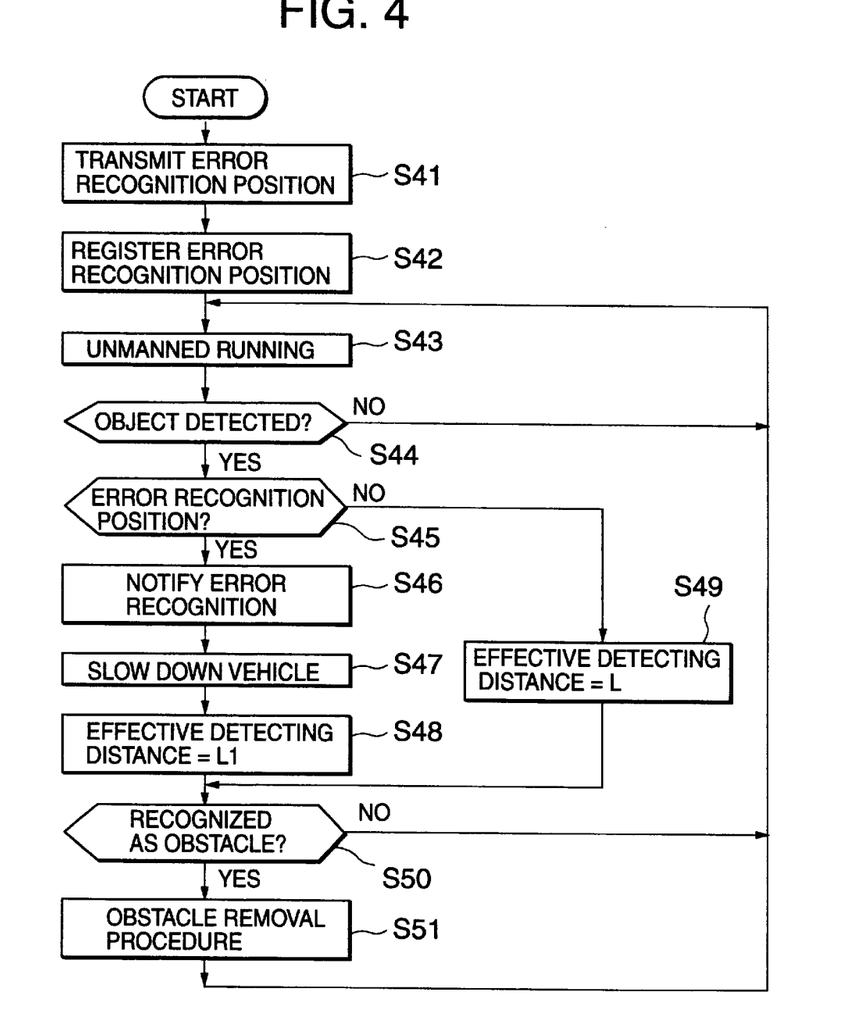
FIG. 4 is a flowchart of a procedure for automatically running a vehicle by means of the unmanned running system according to the present invention.

Referring to FIG. 4, there is shown a flowchart of a procedure S for performing unmanned running of the vehicle 1 on the basis of the registered error recognition positions to prevent the obstacle detecting unit 5 from causing error recognition.

The central control unit 7 transmits the registered error recognition positions to the vehicle control unit 20 of respective vehicles 1 via radio communications (S41) and the vehicle control unit 20 registers these error recognition positions (S42). The vehicle control unit 20 outputs an instruction to the running control unit 14 while detecting the current position of the vehicle 1 by using the position detecting unit 10 and continues the unmanned running in the predetermined course 3 (S43).

Unless the obstacle detecting unit 5 detects any object ahead of the unmanned vehicle, the unmanned running is continued (S44). If an object is detected, the obstacle detecting unit 5 determines whether or not the current position of the vehicle 1 is close to a position a predetermined distance or shorter apart from the registered error recognition position (S45). If the vehicle 1 is closed to a position the predetermined distance or shorter apart from the error recognition position, the vehicle control unit 20 notifies the running control unit 14 and the obstacle detecting unit 5 that it is the error recognition position (S46). The running control unit 14 controls the accelerator 11, the brake 12, and the steering gear 13 to slowdown the vehicle 1 at a predetermined or lower speed, responding to this notification (S47). The obstacle detecting unit 5 changes an effective detecting distance for recognizing the obstacle 4 to an error recognition value L1 (L1<L) smaller than an initial value L after receiving this notification so as to increase a threshold value at a detection of an obstacle (S48) and then the control progresses to S50 of the procedure. This error recognition value L1 is assumed to be a value (L1<D1) smaller than a minimum value D1 of the distance D between the vehicle 1 and the obstacle 4 stored in S29 of the procedure in FIG. 3.

Unless the vehicle 1 is within the predetermined distance apart from the error recognition position in S45 of the procedure, the effective detecting distance is assumed to be the initial value L (S49) and the control progresses to S50 of the procedure.

On the basis of the effective detecting distance, the obstacle detecting unit judges whether or not the object ahead of the vehicle is recognized as an obstacle 4 (S50); unless it is recognized, the control returns to S43 of the procedure to continue the unmanned running. If it is recognized as an obstacle 4, the obstacle 4 is removed on the basis of S8 and S9 of the procedure in FIG. 2 (S51), for example, and the control returns to S43 of the procedure to continue the running.

Figure 5:
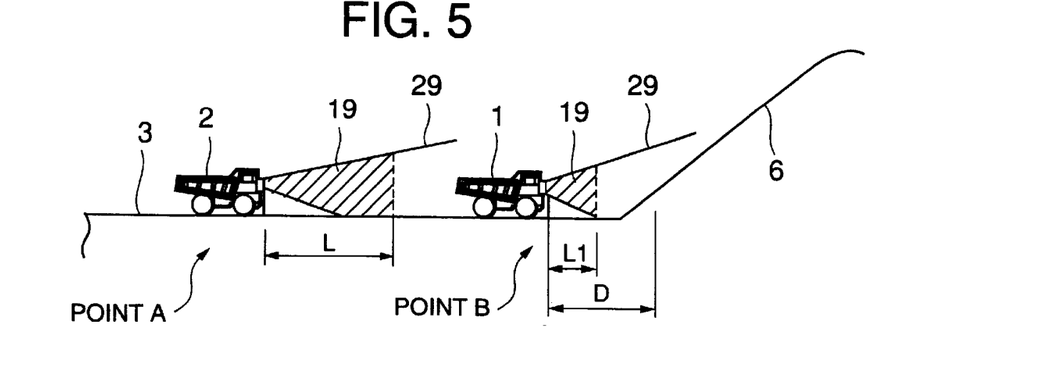
FIG. 5 is an explanatory diagram showing a relationship between a vehicle which runs in a course using the unmanned running system according to the present invention and an effective detecting distance.

Next, the effective detecting distance in FIG. 4 is described below. Referring to FIG. 5, there is shown an effective detecting scope 19 of the radar unit 15 indicated by hatching, ahead of the vehicle 1 running in the course 3.

In this diagram, the obstacle controller 18 of the vehicle 1 running on the level ground (point A) recognizes an obstacle 4 within the effective detecting scope 19 as an obstacle 4. If the vehicle 1 approaches a registered error recognition position (point B), transmitted waves 29 emitted from the radar unit 15 are reflected on an upward slope 6.

The obstacle controller 18, however, judges that the effective detecting distance is an error recognition value L1 smaller than the value of the distance D between the vehicle 1 and the incorrectly recognized upward slope 6, by which the upward slope farther than the error recognition value L1 is not recognized as an obstacle 4. When the vehicle 1 approaches the upward slope 6 further, the vehicle 1 goes up the upward slope 6 and the radar unit 15 tilts upward, by which the upward slope 6 does not reflect the transmitted waves 29 so as not to detect the upward slope 6. It should be noted that a n incline of the upward slope 6 is exaggerated for explanation relative to an actual one.

Figure 6:
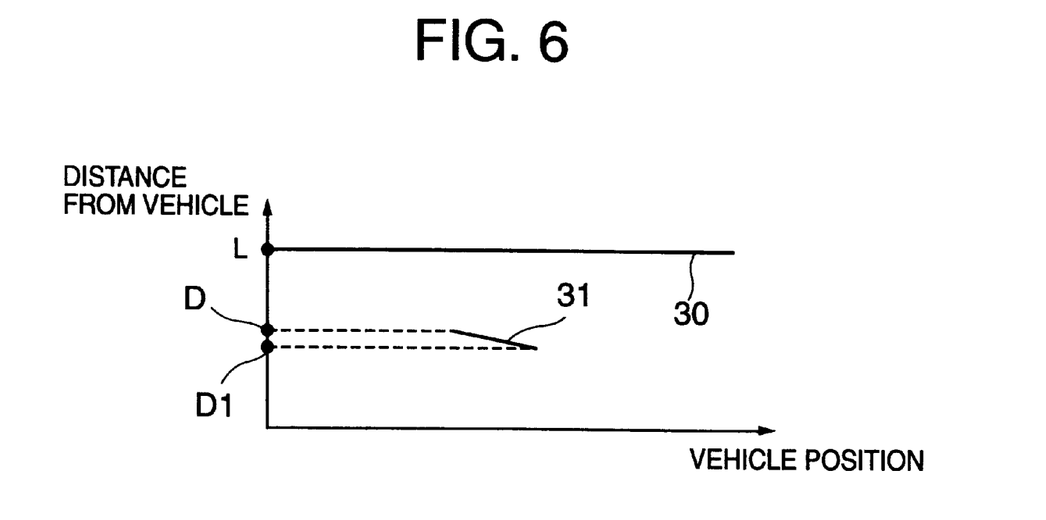
FIG. 6 is an output waveform chart of a radar unit in a trial run.
Figure 7:
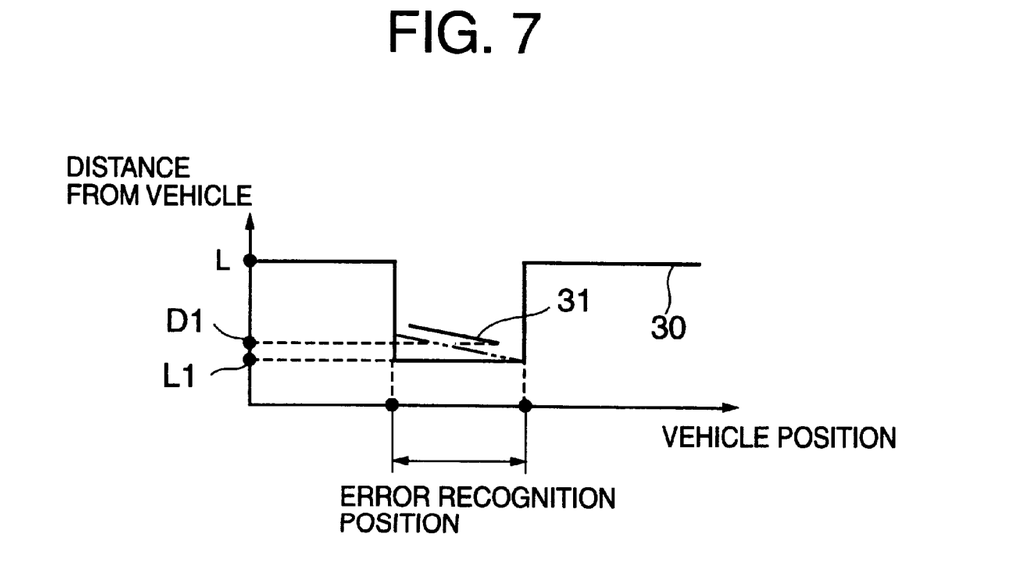
FIG. 7 is an output waveform chart of a radar unit during unmanned running.

FIGS. 6 and 7 show output signals of the radar unit 15 under a trial run and under unmanned running, respectively. An ordinate axis indicates a distance from the vehicle 1 and an abscissa axis indicates a current position of the vehicle 1 according to running thereof. A waveform 30 indicates an effective detecting distance of the radar unit 15 and a waveform 31 indicates an output waveform of the radar unit 15.

As shown in FIG. 6, when the vehicle 1 approaches the upward slope 6 during a trial run, the radar unit 15 observes the waveform 31 in a position the distance D apart from the vehicle 1. At this time, the effective detecting distance of the radar unit 15 is an initial value L greater than the distance D up to the upward grade 6, by which the obstacle controller 18 recognizes this upward slope 6 as an obstacle 4 by mistake.

Therefore in this embodiment, as shown in FIG. 7, if the vehicle 1 approaches the error recognition position during unmanned running, the effective detecting distance is immediately changed to the error recognition value L1 smaller than the minimum value D1 of the distance D to prevent the upward slope 6 from being recognized as an obstacle 4. Then, after the vehicle 1 passes the error recognition position, the effective detecting distance is returned to the initial value L. In this respect, it is also possible for the effective detecting distance to be continuously varied as indicated by a long and two short dashes line according to the distance D up to the upward slope 6 detected during the trial run.

As set forth hereinabove, the error recognition positions are previously registered and the effective detecting distance of the radar unit 15 is reduced when the vehicle approaches the position so that the upward slope 6 is not recognized as an obstacle 4, by which error recognition is prevented. It is also available in relation to error recognition of recess or projecting portions of the course 3. Furthermore, with shortening the effective detecting distance in this manner, it is also possible to prevent error recognition of a tree or a cliff outside the course 3 as well as the upward slope 6 and the unevenness.

At this time, instead of shortening the effective detecting distance, a sensitivity of the radar unit 15 can be lowered or the emitted transmitted waves be weakened. Otherwise, a signal from the radar unit 15 received when this error recognition position is registered can be stored in one of the obstacle controller 18, the vehicle control unit 20, and the central control unit 7 in advance to perform such signal processing that similar signals do not cause recognition of an obstacle 4.

By decreasing a speed of the vehicle 1, pitching of the vehicle 1 is reduced even if there is a recess or projecting portion on the ground of the course 3, which also leads to an advantage of decreasing the number of such error recognition times that the obstacle detecting unit 5 recognizes the ground as an obstacle 4.

Next, a description will be made below for means for updating registered error recognition positions during unmanned running.

During unmanned running, new error recognition may occur in a different position from error recognition positions registered at a trial run. For example, there are such cases that error recognition does not occur during unmanned running though error recognition has occurred at a trail run or that error recognition frequently occurs during unmanned running though no error recognition has occurred at the trial run. In addition, the plurality of vehicles 1 may contain vehicles 1 which frequently cause error recognition in a specific position and vehicles 1 which do not cause error recognition there.

It seems to be the result of a geographical change of the course 3 caused by traveling of a lot of vehicles 1, a speed of the vehicle 1 or stiffness of its suspension, individual differences of respective vehicles 1 such as a mounted position of the radar unit 15 or the like. Therefore, the previously registered error recognition positions are preferably updated on the basis of the latest information during unmanned running.

Figure 8:
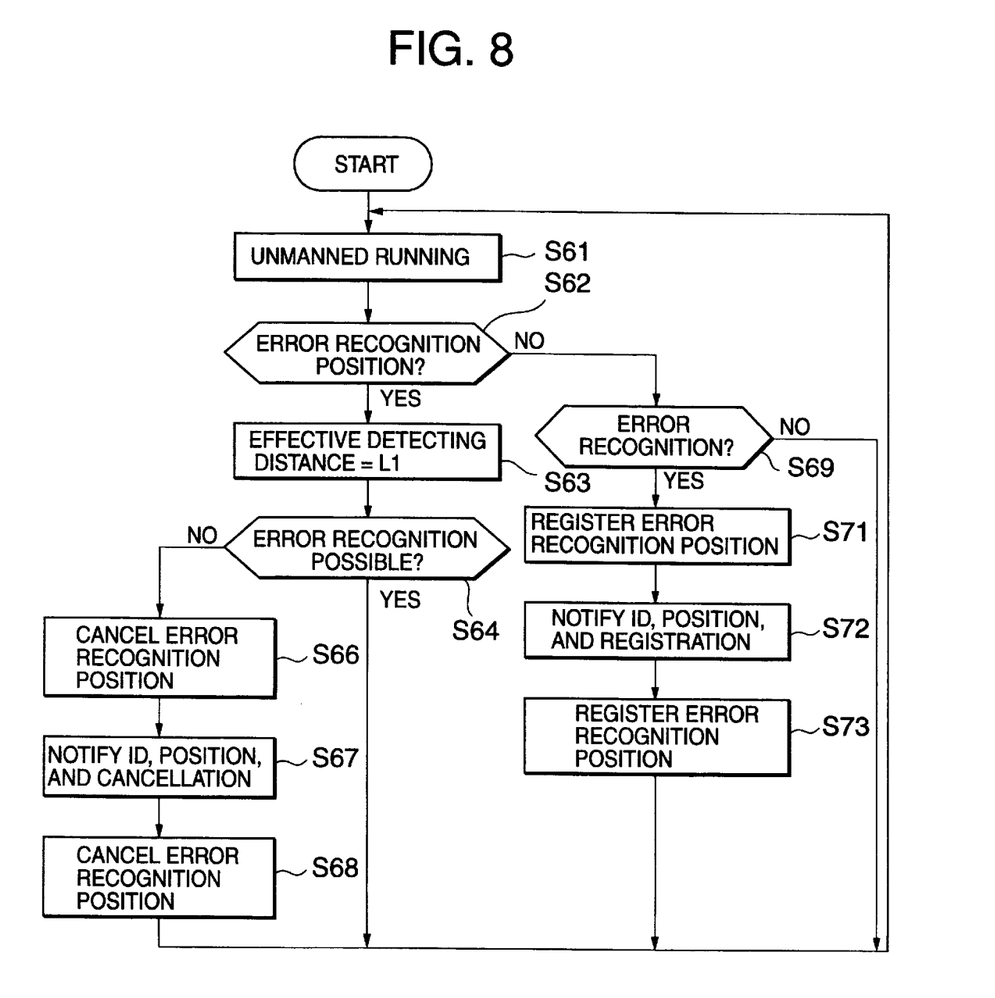
FIG. 8 is a flowchart of a procedure for updating an error recognition position by means of the unmanned running system of the present invention.

Referring to FIG. 8, there is shown a flowchart of a procedure S for updating error recognition positions. In this diagram, the vehicle control unit 20 of each vehicle 1 performs unmanned running of the vehicle 1 on the basis of an instruction of the central control unit 7 (S61). The vehicle control unit 20 judges whether or not the vehicle 1 approaches an error recognition position previously registered in the vehicle control unit 20 on the basis of an output signal from the position detecting unit 10 (S62). If it approaches the error recognition position, the effective detecting distance is reduced to the error recognition value L1 in S45 to S48 of the procedure in FIG. 4 (S63).

Then, on the basis of the output signal from the radar unit 15, it is judged whether or not there is a possibility that the obstacle detecting unit 5 will recognize this position incorrectly if the effective detecting distance remains the initial value L (S64). In other words, if the obstacle detecting unit 5 may detect an upward slope 6 or a recess or projecting portion ahead of the vehicle 1 in such a position that the effective detecting distance is greater than the error recognition value L1 and smaller than the initial value L, it is judged that the obstacle detecting unit 5 will recognize this position incorrectly. If so, the processing returns to S61 of the procedure to continue the unmanned running.

In this respect, in S64 of the procedure the possibility can be judged as described below. In other words, previously is stored an output signal of the radar unit 15 generated when the obstacle controller 18 incorrectly recognizes an obstacle 4 at a trial run or when this position has been registered as an error recognition position before. Then, this output signal can be compared with an output signal in the same position during unmanned running so as to judge whether or not there is a possibility that the same error recognition will occur.

Otherwise, if the vehicle 1 has a phototaking device 24, an observer can take a photo of a scene ahead of the vehicle 1 manually when the vehicle 1 approaches the error recognition position, check the image on the monitor 9, and then compare this image with the output signal from the radar unit 15 to judge the error recognition.

In S64 of the procedure, if it is judged that the obstacle detecting unit 5 will not cause error recognition, the vehicle control unit 20 cancels the registration of this position as an error recognition position (S66). Then, the vehicle control unit 20 transmits an ID of this vehicle 1 and the current position to the central control unit 7 via a radio communication to notify it of the cancellation of the registration (S67). The central control unit 7 cancels the registration of this vehicle as an error recognition position (S68) and returns to S61 to continue the unmanned running. In other words, the vehicle control unit 20 of the vehicle 1 is adapted not to treat this position as an error recognition position in the next and subsequent running.

If the vehicle 1 does not approach the error recognition position in S62 of the procedure, the vehicle control unit 20 judges whether or not the obstacle detecting unit 5 will cause error recognition (S69). Unless error recognition occurs in a position other than the error recognition positions, the operation is normal and therefore the control returns to S61 of the procedure to continue the unmanned running. If error recognition occurs in a position other than the error recognition positions, the vehicle control unit 20 registers this position as an error recognition position anew (S71). Then, the vehicle control unit 20 transmits an ID of the vehicle 1 and the current position to the central control unit 7 via a radio communication (S72). Receiving them, the central control unit 7 registers this position as an error recognition position for the vehicle 1 (S73). Then, the control returns to S61 of the procedure to continue the unmanned running.

In this respect, most preferably the phototaking device 24 is used for the judgment of the possibility of the error recognition in S69 of the procedure. If the obstacle detecting unit 5 detects an obstacle 4, the vehicle 1 stops as shown in S3 of the procedure in FIG. 2. At this time, the observer takes a photo of the obstacle 4 by using the phototaking device 24 and checks the image to judge whether or not it is error recognition, and then can input it manually into the central control unit 7.

Otherwise, even if a vehicle 1 does not have a phototaking device 24, the above error recognition position can be registered or updated. In other words, in the same manner as for the prior art, a worker can go to the place by movable means such as, for example, a helicopter or a car to judge whether or not it is error recognition.

In FIG. 8, the error recognition position is not updated only based on a single-time judgment of presence or absence of error recognition, but can be updated when error recognition occurs a predetermined or greater number of times.

Otherwise, the error recognition position can be updated when error recognition occurs continuously a predetermined or greater number of times or when it occurs at a predetermined or greater percentage of probability.

Regarding updating error recognition positions, a procedure described below can also be used. In other words, if the obstacle detecting unit 5 detects an obstacle 4 and stops during automatic running, an observer judges whether or not it is error recognition by using the phototaking device 4. If it Is error recognition, the observer inputs the information into the central control unit 7, transmits an instruction to the vehicle control unit 20 via a radio communication so as to transmit error recognition data from the vehicle control unit 20, and registers the place as an error recognition position. This registration can be performed either automatically or by an observer manually, or the observer can modify the error recognition position automatically registered.

In this respect, if the registration and the cancellation of error recognition is performed collectively for all the vehicles 1, time and labor wasted for the registration and the cancellation are omitted and therefore a load on the central control unit 7 is reduced advantageously.

If the registration and the cancellation of error recognition is performed for each vehicle 1, error recognition can be prevented more reliably even if there are differences among respective vehicles 1 in their sensitivity of the obstacle detecting unit 5, a mounted position of the radar unit 15 or the like.

Furthermore, there may be a difference in a way of an occurrence of error recognition between a loaded vehicle 1 and a unloaded vehicle 1. Taking it into consideration, the error recognition position can be registered or canceled according to a condition of a load on the vehicle 1.

While error recognition position is registered by a driver at a trial run in the above description, it is not limited to this. In other words, it is also possible for the observer to register or cancel the registration of the error recognition position individually for each vehicle 1, for example, by using the phototaking device 24 during unmanned running without any registration at a trial run.

As set forth hereinabove, according to the present invention, the obstacle detecting unit 5 previously registers error recognition positions where the obstacle detecting unit 5 may easily recognize an obstacle 4 incorrectly, and when the vehicle 1 approaches this error recognition position, setting of the obstacle detecting unit 5 is changed to prevent error recognition. This decreases the number of times when error recognition occurs in a place where no obstacle 4 exists actually, by which the vehicle 1 stops by mistake less frequently.

As means for preventing error recognition, there are means for shortening the effective detecting distance of the obstacle detecting unit 5. This makes it possible to change settings of a plenty of vehicles 1 immediately only by changing parameters in the obstacle controller 18 without a need for adjusting the radar unit 15.

The error recognition position is registered at a trial run. Accordingly, error recognition positions are checked by the driver during manned running before their registrations, by which error recognition positions are hardly registered by mistake. Furthermore, it is possible to register error recognition positions of all vehicles 1 at the central control unit 7 at a single run and therefore only a short period of time is required for registering error recognition positions.

In addition, the registration of error recognition positions is updated at unmanned running. Accordingly, it is possible to deal with a geographical change of the course 3 caused by unmanned running, by which error recognition can be prevented reliably at all times. Furthermore, the registrations of error recognition positions are updated for each vehicle 1. Therefore, even if there is a difference in a level of an obstacle 4 incorrectly recognized according to a vehicle 1, it is possible to take a careful countermeasure for each vehicle 1 so as to prevent error recognition more reliably.

In addition, an observer monitors a scope ahead of the vehicle 1 from a distant place by using the phototaking device 24 to update error recognition positions. Therefore, the information can be updated without a need for a worker to go to the site for updating, thereby reducing a period of time for updating.

In this manner, the vehicle 1 is less frequently stopped by the obstacle detecting unit 5 which has recognized an obstacle 4 by mistake during unmanned running, thereby improving a working efficiency of the unmanned running system.

While error recognition positions are registered at both of the vehicle control unit 20 and the central control unit 7 in the above description, it is also possible to register them only at the central control unit 7 so as to give the information to respective vehicles 1. This makes it possible to obtain a unitary management of error recognition positions, thereby reducing errors of information transmission. In addition, it becomes possible for an operator to register an error recognition position at the central control unit 7 or cancels it manually.

Otherwise, error recognition positions can be registered only at the vehicle control unit 20 for each vehicle 1 without registering the error recognition positions at the central control unit 7. This makes it possible for each vehicle 1 to register or cancel the error recognition positions individually, by which unmanned running can be performed on the basis of a judgment of the vehicle itself without frequent radio communications, thereby decreasing a delay during traveling. In addition, a load required for checking an error recognition position is reduced in a radio communication, by which a running instruction can be accurately output.

Furthermore, if error recognition positions are registered only at the vehicle control unit 20, the present invention is applicable to a case in which vehicles 1 communicate with each other by means of radio communications without an arrangement of the central monitor station 2 during unmanned running. If a vehicles 1 cannot receive a communication from the central monitor station 2 for some reason, respective vehicles 1 can share the information with each other.

What is claimed is:

1. An unmanned vehicle running system, comprising:

a plurality of vehicles running without a driver in a predetermined course while detecting a current position of the vehicle; and a central monitor station for monitoring operations of the plurality of vehicles, wherein each of said vehicles is provided with a phototaking device for taking a photo of said course and with a vehicle communication unit configured for transmitting the taken image to the central monitor station;

wherein said central monitor station is provided with a central communication unit configured for receiving the image and with a monitor for displaying the image;

wherein said vehicle is provided with an obstacle detecting unit for detecting an obstacle which blocks the passage; and wherein said phototaking device takes a photo only when the obstacle detecting unit detects an obstacle.

2. An unmanned vehicle running system according to claim 1, wherein said central monitor station is provided with a manual phototaking switch for inputting a phototaking instruction and with said central communication unit configured for transmitting the phototaking instruction to the respective vehicles;

wherein each of said vehicles is provided with said vehicle communication unit configured for receiving the phototaking instruction; and wherein the phototaking device takes a photo when the phototaking instruction is inputted.

3. An unmanned vehicle running system, comprising:

a position detecting unit for detecting the current position and an obstacle detecting unit for detecting an obstacle which blocks the passage in the vehicle side; and a vehicle control unit for running said vehicle without a driver in a predetermined course on the basis of detection signals from the position detecting unit and from the obstacle detecting unit, wherein said vehicle control unit registers a position of said vehicle and the detection signals from said obstacle detecting unit when said obstacle detecting unit recognizes a non-obstacle as an obstacle by mistake, and judges whether or not said vehicle has approached the registered position during running so as to prevent a non-obstacle from being recognized as an obstacle by mistake on the basis of the registered detection signals in the vicinity of the registered position.

4. An unmanned vehicle running system according to claim 3, comprising:

a central monitor station for monitoring operations of said plurality of vehicles, wherein each vehicle is provided with a vehicle communication unit and the central monitor station is provided with a central communication unit so that they have radio communications with each other; and wherein the central monitor station is provided with a central control unit for registering error recognition positions for each vehicle on the basis of a position of each vehicle received therefrom when said obstacle detecting unit recognizes a non-obstacle as an obstacle by mistake; and wherein said each vehicle is provided with a vehicle control unit for registering an error recognition position for each vehicle received from said central monitor station.

* * * * *